United States Patent
Sharifi et al.

(10) Patent No.: US 11,984,128 B2
(45) Date of Patent: May 14, 2024

(54) AUTOMATIC GENERATION AND/OR USE OF TEXT-DEPENDENT SPEAKER VERIFICATION FEATURES

(71) Applicant: GOOGLE LLC, Mountain View, CA (US)

(72) Inventors: Matthew Sharifi, Kilchberg (CH); Victor Carbune, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 169 days.

(21) Appl. No.: 17/700,135

(22) Filed: Mar. 21, 2022

(65) Prior Publication Data

US 2022/0215845 A1 Jul. 7, 2022

Related U.S. Application Data

(63) Continuation of application No. 17/069,565, filed on Oct. 13, 2020, now Pat. No. 11,315,575.

(51) Int. Cl.
*G10L 17/08* (2013.01)
*G06F 3/16* (2006.01)
(Continued)

(52) U.S. Cl.
CPC .............. *G10L 17/08* (2013.01); *G06F 3/167* (2013.01); *G06F 21/32* (2013.01); *G10L 15/22* (2013.01);
(Continued)

(58) Field of Classification Search
CPC ......... G10L 17/08; G10L 15/22; G10L 17/02; G10L 17/04; G10L 17/10; G10L 17/14;
(Continued)

(56) References Cited

U.S. PATENT DOCUMENTS 6,393,305 B1 * 5/2002 Ulvinen ............... G06Q 20/322
455/566
6,691,089 B1 * 2/2004 Su ........................... G10L 17/24
704/250
(Continued)

FOREIGN PATENT DOCUMENTS

JP 2018527609 9/2018
KR 20010009081 2/2001
(Continued)

OTHER PUBLICATIONS

European Patent Office; Communication issued in Application No. 23163405.6; 6 pages; dated Jul. 31, 2023.
(Continued)

*Primary Examiner* — Edwin S Leland, III
(74) *Attorney, Agent, or Firm* — Gray Ice Higdon

(57) ABSTRACT

Implementations relate to automatic generation of speaker features for each of one or more particular text-dependent speaker verifications (TD-SVs) for a user. Implementations can generate speaker features for a particular TD-SV using instances of audio data that each capture a corresponding spoken utterance of the user during normal non-enrollment interactions with an automated assistant via one or more respective assistant devices. For example, a portion of an instance of audio data can be used in response to: (a) determining that recognized term(s) for the spoken utterance captured by that the portion correspond to the particular TD-SV; and (b) determining that an authentication measure, for the user and for the spoken utterance, satisfies a threshold. Implementations additionally or alternatively relate to utilization of speaker features, for each of one or more particular TD-SVs for a user, in determining whether to authenticate a spoken utterance for the user.

20 Claims, 8 Drawing Sheets

(51) Int. Cl.
  *G06F 21/32* (2013.01)
  *G10L 15/22* (2006.01)
  *G10L 17/02* (2013.01)
  *G10L 17/04* (2013.01)
  *G10L 17/10* (2013.01)
  *G10L 17/14* (2013.01)
  *G10L 17/18* (2013.01)
  *G10L 17/22* (2013.01)
  *G10L 17/24* (2013.01)
  *G10L 15/08* (2006.01)

(52) U.S. Cl.
  CPC ............... *G10L 17/02* (2013.01); *G10L 17/04* (2013.01); *G10L 17/10* (2013.01); *G10L 17/14* (2013.01); *G10L 17/18* (2013.01); *G10L 17/22* (2013.01); *G10L 17/24* (2013.01); *G10L 2015/088* (2013.01); *G10L 2015/227* (2013.01)

(58) Field of Classification Search
  CPC ......... G10L 17/18; G10L 17/22; G10L 17/24; G10L 2015/088; G10L 2015/227; G06F 3/167; G06F 21/32
  USPC .......................................................... 704/246
  See application file for complete search history.

(56) References Cited

U.S. PATENT DOCUMENTS

| | | | |
|---|---|---|---|
| 9,741,348 B2* | 8/2017 | Roblek | G10L 15/02 |
| 9,792,899 B2* | 10/2017 | Aronowitz | G10L 17/04 |
| 9,990,926 B1* | 6/2018 | Pearce | G10L 15/05 |
| 10,002,613 B2* | 6/2018 | Rubin | G10L 25/51 |
| 10,255,922 B1 | 4/2019 | Sharifi | |
| 10,325,602 B2* | 6/2019 | Sak | G10L 17/02 |
| 10,339,290 B2* | 7/2019 | Valenti | G06F 21/46 |
| 10,354,656 B2* | 7/2019 | Zhao | G10L 17/04 |
| 10,373,612 B2* | 8/2019 | Parthasarathi | G10L 15/02 |
| 10,438,593 B2* | 10/2019 | Alvarez Guevara | G10L 17/18 |
| 10,580,401 B2* | 3/2020 | Lopez Moreno | G06N 3/045 |
| 10,650,824 B1* | 5/2020 | Kesharaju | G10L 17/00 |
| 10,923,111 B1* | 2/2021 | Fan | G10L 15/16 |
| 11,282,500 B2* | 3/2022 | Griffin | G10L 15/063 |
| 11,315,575 B1* | 4/2022 | Sharifi | G10L 17/02 |
| 2005/0171851 A1* | 8/2005 | Applebaum | G06F 21/32 |
| | | | 705/18 |
| 2008/0195389 A1* | 8/2008 | Zhang | G10L 17/24 |
| | | | 704/E17.011 |
| 2013/0132091 A1* | 5/2013 | Skerpac | G07C 9/37 |
| | | | 704/273 |
| 2015/0127336 A1* | 5/2015 | Lei | G10L 17/18 |
| | | | 704/232 |
| 2015/0187356 A1* | 7/2015 | Aronowitz | G10L 17/24 |
| | | | 704/249 |
| 2015/0294670 A1* | 10/2015 | Roblek | G10L 17/18 |
| | | | 704/232 |
| 2015/0302856 A1 | 10/2015 | Kim | |
| 2016/0019883 A1* | 1/2016 | Aronowitz | G10L 17/04 |
| | | | 704/244 |
| 2016/0293167 A1* | 10/2016 | Chen | H04N 21/23406 |
| 2017/0069327 A1* | 3/2017 | Heigold | G10L 17/04 |
| 2017/0236520 A1* | 8/2017 | Borgstrom | G10L 17/12 |
| | | | 704/239 |
| 2017/0301353 A1* | 10/2017 | Mozer | G10L 17/02 |
| 2019/0027152 A1* | 1/2019 | Huang | G10L 21/0208 |
| 2019/0051299 A1* | 2/2019 | Ossowski | G10L 15/22 |
| 2019/0272831 A1* | 9/2019 | Kajarekar | G10L 17/06 |
| 2019/0392839 A1* | 12/2019 | Fujimura | G10L 15/16 |
| 2020/0150919 A1* | 5/2020 | Rand | H04R 1/406 |
| 2022/0115022 A1* | 4/2022 | Sharifi | G10L 17/08 |
| 2022/0215845 A1* | 7/2022 | Sharifi | G10L 17/14 |

FOREIGN PATENT DOCUMENTS

| | | |
|---|---|---|
| KR | 20190015488 | 2/2019 |
| KR | 20190079692 | 7/2019 |
| WO | 2019168661 | 9/2019 |

OTHER PUBLICATIONS

European Patent Office; International Search Report and Written Opinion of PCT Application No. PCT/US2020/064984; 20 pages; dated Aug. 18, 2021.

European Patent Office; Invitation to Pay Additional Fees; PCT Application No. PCT/US2020/064984; 12 pages; dated Jun. 24, 2021.

Japanese Patent Office; Notice of Reasons for Rejection issued in Application No. 2023-517765; 5 pages; dated Sep. 11, 2023.

European Patent Office, Intention to Grant issued in Application No. 23163405.6; 58 pages; dated Feb. 29, 2024.

* cited by examiner

AUTOMATIC GENERATION AND/OR USE OF TEXT-DEPENDENT SPEAKER VERIFICATION FEATURES

BACKGROUND

Humans can engage in human-to-computer dialogs with interactive software applications referred to herein as "automated assistants" (also referred to as "chatbots," "interactive personal assistants," "intelligent personal assistants," "personal voice assistants," "conversational agents," etc.). For example, humans (which when they interact with automated assistants may be referred to as "users") may provide commands/requests to an automated assistant using spoken natural language input (i.e., spoken utterances), which may in some cases be converted into text and then processed, and/or by providing textual (e.g., typed) natural language input. An automated assistant generally responds to a command or request by providing responsive user interface output (e.g., audible and/or visual user interface output), controlling smart device(s), and/or performing other action(s).

Some user commands or requests will only be fully processed and responded to when the automated assistant authenticates the requesting user. For example, to maintain security of personal data, user authentication can be required for requests that access personal data of the user in generating a response and/or that would incorporate personal data of the user in the response. For instance, user authentication can be required to appropriately respond to requests such as "what's on my calendar for tomorrow" (which requires accessing the requesting user's personal calendar data and including personal calendar data in a response) and "message Vivian I'm running late" (which requires accessing the requesting user's personal contact data). As another example, to maintain security of smart devices (e.g., smart thermostats, smart lights, smart locks), user authentication can be required for requests that cause control of one or more of such smart devices.

Various techniques for user authentication for automated assistants have been utilized. For example, in authenticating a user, some automated assistants utilize text-dependent speaker verification (TD-SV) that is constrained to invocation phrase(s) for the assistant (e.g., "OK Assistant" and/or "Hey Assistant"). With such TD-SV, an enrollment procedure is performed in which the user is explicitly prompted to provide one or more instances of a spoken utterance of the invocation phrase(s) to which the TD-SV is constrained. Speaker features (e.g., a speaker embedding) for a user can then be generated through processing of the instances of audio data, where each of the instances captures a respective one of the spoken utterances. For example, the speaker features can be generated by processing each of the instances of audio data using a TD-SV machine learning model to generate a corresponding speaker embedding for each of the utterances. The speaker features can then be generated as a function of the speaker embeddings, and stored (e.g., on device) for use in TD-SV. For example, the speaker features can be a cumulative speaker embedding that is a function of (e.g., an average of) the speaker embeddings.

After the speaker features are generated, the speaker features can be used in verifying that a spoken utterance was spoken by the user. For example, when another spoken utterance is spoken by the user, audio data that captures the spoken utterance can be processed to generate utterance features, those utterance features compared to the speaker features, and, based on the comparison, a determination made as to whether to authenticate the speaker. As one particular example, the audio data can be processed, using the speaker recognition model, to generate an utterance embedding, and that utterance embedding compared with the previously generated speaker embedding for the user in determining whether to verify the user as the speaker of the spoken utterance. For instance, if a distance metric between the generated utterance embedding and the speaker embedding for the user satisfies a threshold, the user can be verified as the user that spoke the spoken utterance. Such verification can be utilized as a criterion (e.g., the sole criterion) for authenticating the user.

However, existing techniques for TD-SV based on only invocation phrases present various drawbacks. For example, it is often the case that the comparison between the utterance features and the speaker features is insufficient to verify the user with sufficient confidence. For instance, when the comparison includes generating a distance metric between utterance features that are an utterance embedding and speaker features that are a speaker embedding, the distance metric may not satisfy a closeness threshold for verifying the user. As a result, the automated assistant may have to prompt the user to again speak the invocation phrase to again attempt to verify and/or may have to prompt the user for further alternate authentication data (e.g., prompt for the user to provide a PIN or other passcode, prompt for the user to interact with a fingerprint sensor, and/or prompt for the user to position in front of a camera for facial identification). This results in the human-assistant interaction being prolonged and resultant prolonged utilization of client device resources and/or other resources for facilitating the human-assistant interaction. As another example, when a user invokes an automated assistant without using invocation phrase(s) (e.g., instead invokes through interaction with a hardware button of a corresponding device, squeezing a corresponding device, looking at a corresponding device (e.g., as detected based on image(s) from camera(s) of the corresponding device, etc.), TD-SV based on only invocation phrases does not work since no invocation phrase was spoken in invoking the automated assistant. Accordingly, in such a situation the automated assistant would have to prompt the user to speak an invocation phrase and/or prompt the user for alternate authentication data. This results in the human-assistant interaction being prolonged and resultant prolonged utilization of client device resources and/or other resources for facilitating the human-assistant interaction. As yet another example, TD-SV techniques require performance of an enrollment procedure and resultant utilization of client device resources and/or other resources for performing the enrollment procedure.

SUMMARY

Some implementations disclosed herein relate to automatic generation of speaker features for each of one or more particular text-dependent speaker verifications (TD-SVs) for a user. Each particular TD-SV for a user is associated with one or more specific words and/or phrases to which it is constrained. For example, a first particular TD-SV can be constrained to a single word such as "door", a second particular TD-SV can be constrained to a single phrase such as "front door", and a third particular TD-SV can be constrained to two or more phonetically similar words such as "light" and "lights". Further, each particular TD-SV for a user is associated with speaker features, for that particular TD-SV, that are generated according to implementations disclosed herein. The speaker features for the particular TD-SV can be, for example, a speaker embedding. The word(s) and/or phrase(s) to which a particular TD-SV is constrained can be selected based on the word(s) and/or phrase(s) relating to corresponding assistant action(s) for which user verification is at least selectively required.

Implementations can generate speaker features for a particular TD-SV using instances of audio data that each capture a corresponding spoken utterance of the user during normal non-enrollment interactions with an automated assistant via one or more respective assistant devices. More particularly, a portion of an instance of audio data can be used in response to: (a) determining that recognized term(s) (determined using speech recognition performed on the audio data) for the spoken utterance captured by that the portion correspond to the particular TD-SV; and (b) determining that an authentication measure, for the user and for the spoken utterance, satisfies a threshold that indicates sufficient confidence that it is the user who spoke the spoken utterance. The authentication measure can be based on one or more factors such as a fingerprint verification for the user, a facial verification for the user, analysis of a verification code entered by the user, a different particular TD-SV for which speaker features have already been generated, and/or a general invocation TD-SV. The general invocation TD-SV is based on processing the audio data or preceding audio data that precedes the audio data, is for the user, and is for one or more general invocation wake words for the automated assistant.

As one particular example, assume a particular TD-SV for a user that is constrained to the phrase "kitchen thermostat". Further, assume that a user invokes an automated assistant of an assistant device and provides a spoken utterance of "set the kitchen thermostat to seventy two degrees". The automated assistant can perform speech recognition of the spoken utterance based on corresponding captured audio data to generate a recognition of "set the kitchen thermostat to seventy two degrees" for the spoken utterance. The automated assistant can further determine an authentication measure for the utterance based on, for example, a facial verification for the user that is performed based on image(s) captured by a camera of the assistant device before, during, and/or after the spoken utterance. The authentication measure can be determined to satisfy a threshold based on, for example, the facial verification indicating at least a threshold degree of confidence that the image(s) capture a face that corresponds to a stored facial embedding for the user.

In response to determining that the authentication measure satisfies the threshold, and in response to determining the recognition includes the term "kitchen thermostat" (and optionally that a speech recognition confidence measure for that term satisfies a threshold), the portion of audio data that corresponds to "kitchen thermostat" (e.g., as indicated by speech recognition) can be used in generating speaker features for the particular TD-SV. For example, the portion of audio data can be processed using a neural network model to generate an embedding, such as an embedding that includes values from a hidden layer of the neural network after processing the audio data. That embedding can be used in generating the speaker features. For example, the embedding can be used as the speaker features, or the speaker features can be generated as a function of the embedding and other embedding(s) that are each generated based on a respective portion of respective audio data that captured "kitchen thermostat" in a spoken utterance when a respective verification measure for the user satisfied the threshold. Further, it is noted that the automated assistant can also perform the assistant action that is conveyed by the utterance. Namely, the automated assistant can perform the assistant action of causing the kitchen thermostat set point to be adjusted to seventy two degrees.

In these and other manners, speaker features for a particular TD-SV constrained to the phrase "kitchen thermostat" can be generated based on spoken utterances from normal user interactions with the automated assistant—and without any interruption of the human-assistant interaction. This obviates the need for a separate computationally burdensome enrollment procedure to generate speaker features for the particular TD-SV. Further, utilization of a portion of audio data that speech recognition determines corresponds to the phrase "kitchen thermostat" (optionally with a threshold level of confidence) enables automatic determination of portions of audio data that correspond to the phrase for the particular TD-SV. Yet further, generating speaker features based on the portion only when the authentication measure for the user satisfies a threshold ensures that the speaker features, for the particular TD-SV for the user, is indeed being generated for the user and based on a spoken utterance of the user.

Some implementations disclosed herein additionally or alternatively relate to utilization of speaker features, for each of one or more particular TD-SVs for a user, in determining whether to authenticate a spoken utterance for the user. As one example, speech recognition can be performed based on audio data that captures the spoken utterance, to generate a recognition of the spoken utterance. If term(s) of the recognition correspond to those of a particular TD-SV, a corresponding portion of the audio data can be processed to generate utterance features, and those utterance features compared to the speaker features for the particular TD-SV in determining whether to authenticate the user. For instance, the portion of the audio data can be processed using a neural network model (e.g., the one used in generating the speaker features for the TD-SV) to generate an embedding and the embedding can be the utterance features. Further, the embedding can be compared to speaker features for the TD-SV and for the user, that are also an embedding. For instance, the comparison can include generating a cosine distance measurement or other distance metric. Determining whether to authenticate the user can be based on the comparison (e.g., based on a generated distance metric). For example, authentication of the user can be contingent on the comparison indicating at least a threshold degree of similarity (e.g., less than a threshold distance when embeddings are being compared).

In various implementations, the spoken utterance includes at least first term(s) that correspond to a first particular TD-SV and second term(s) that correspond to a second particular TD-SV. For example, the spoken utterance can be "open the garage door" and the first term(s) can be "open" and the second term(s) can be "garage door". In those implementations, a first portion of the audio data, that corresponds to the first term(s), can be processed to generate first utterance features and those first utterance features compared to first speaker features for the first particular TD-SV. Further, a second portion of the audio data, that corresponds to the second term(s), can be processed to generate second utterance features and those second utterance features compared to second speaker features for the first particular TD-SV. Determining whether to authenticate the user can be based on both the first comparison of the first utterance features to the first speaker features and the second comparison of the second utterance features to the second speaker features. For example, authentication of the user can be contingent on both the first comparison indicating at least a threshold degree of similarity and the second comparison indicating at least the threshold degree of similarity. As another example, a first distance metric from the first comparison and a second distance metric from the second comparison can be averaged and/or otherwise combined to generate an overall distance metric, and authentication of the user can be contingent on the overall distance metric indicating at least a threshold degree of similarity. Optionally, the first and second distance metrics can be weighted differently in the averaging or otherwise combining. For example, the first distance metric can be weighted more heavily based on the first speaker features being based on a greater quantity of past spoken utterances of the user than the speaker features for the second speaker features. As another example, the first distance metric can additionally or alternatively be weighted more heavily based on a speech recognition confidence, for the first term(s), being more indicative of confidence than a speech recognition confidence for the second term(s). As yet another example, the second distance metric can additionally or alternatively be weighted more heavily based on "garage door" (corresponding to the first TD-SV) including a greater quantity of characters and/or a greater quantity of syllables than does "open" (corresponding to the second TD-SV). In various implementations, the weighting of a distance metric can be a function of two or more features such as the quantity of spoken utterances on which the corresponding speaker features are based, speech recognition confidence for the corresponding term(s), and/or length (e.g., character, syllable, and/or other length(s)) of the corresponding term(s).

In implementations that determine whether to authenticate the user by considering multiple disparate particular TD-SVs for a user, and based on a single utterance of the user, accuracy and/or robustness of the authentication can be increased. This can obviate the need for prompting for alternate authentication data (e.g., prompt for the user to provide a PIN or other passcode, prompt for the user to interact with a fingerprint sensor, and/or prompt for the user to position in front of a camera for facial identification). This prevents the human-assistant interaction from being prolonged, reduces a quantity of inputs required by the user during the human-assistant interaction, and lessens the amount of client device resources and/or other resources needed for facilitating the human-assistant interaction.

As described above, a particular TD-SV can be constrained to word(s) that are not invocation wake words for the assistant and/or that are associated with assistant action(s) for which user authentication is at least selectively required. Accordingly, the speaker feature for the particular TD-SV can be utilized to authenticate the user in situations where the automated assistant was invoked without utilization of an invocation hotword (e.g., instead invoked in response to a touch gesture, a touch-free gesture, presence detection, and/or a gaze of the user). In these and other manners, the automated assistant is made more robust by enabling authentication of the user without requiring prompting for alternate authentication data and/or by enabling robust authentication when a user is interacting with assistant devices that may lack a fingerprint sensor, a camera, and/or other sensor(s) for providing alternate authentication data. Moreover, this can obviate the need for prompting for alternate authentication data in situations where the user invokes the assistant without utilization of an invocation hotword. This prevents the human-assistant interaction from being prolonged, reduces a quantity of inputs required by the user during the human-assistant interaction, and lessens the amount of client device resources and/or other resources needed for facilitating the human-assistant interaction.

The above is provided merely as an overview of some implementations. Those and/or other implementations are disclosed in more detail herein.

DETAILED DESCRIPTION

Figure 1:
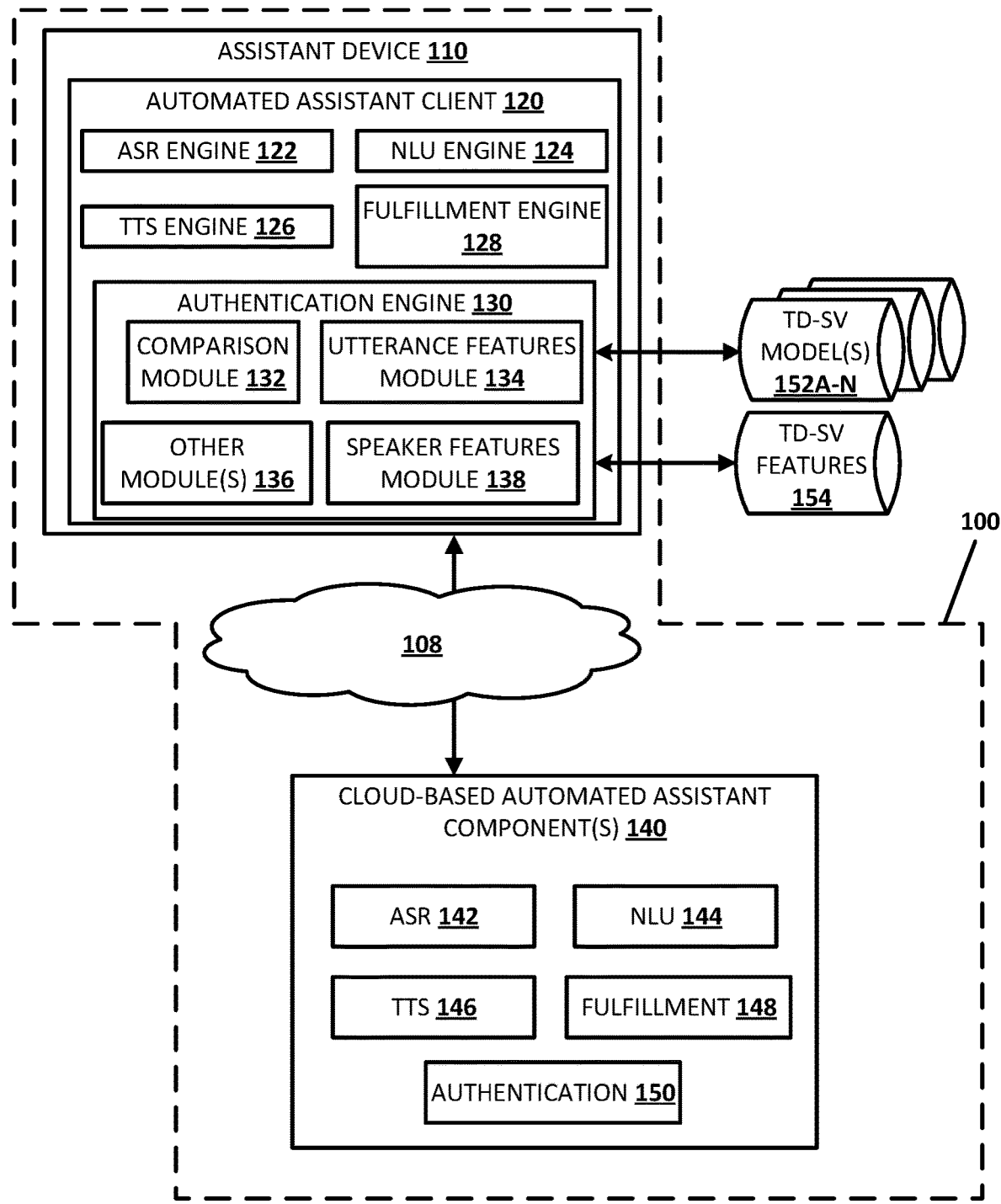
FIG. 1 is a block diagram of an example computing environment in which implementations disclosed herein may be implemented.

Turning initially to FIG. 1, an example environment is illustrated in which various implementations can be performed. FIG. 1 includes an assistant device 110 (i.e., a client device executing an automated assistant client and/or via which an automated assistant is otherwise accessible), which executes an instance of an automated assistant client 120. One or more cloud-based automated assistant components 140 can be implemented on one or more computing systems (collectively referred to as a "cloud" computing system) that are communicatively coupled to assistant device 102 via one or more local and/or wide area networks (e.g., the Internet) indicated generally at 108.

An instance of an automated assistant client 120, optionally via interaction(s) with one or more of the cloud-based automated assistant components 140, can form what appears to be, from the user's perspective, a logical instance of an automated assistant with which the user may engage in a human-to-computer dialog. An instance of such an automated assistant 100 is depicted in FIG. 1.

The assistant device 110 can be, for example: a desktop computing device, a laptop computing device, a tablet computing device, a mobile phone computing device, a computing device of a vehicle (e.g., an in-vehicle communications system, an in-vehicle entertainment system, an in-vehicle navigation system), a standalone interactive speaker, a smart appliance such as a smart television, and/or a wearable apparatus that includes a computing device (e.g., a watch having a computing device, glasses having a computing device, a virtual or augmented reality computing device).

Assistant device 110 can be utilized by one or more users within a household, a business, or other environment. Further, one or more users may be registered with the assistant device 110 and have a corresponding user account accessible via the assistant device 110. Text-dependent speaker verification(s) (TD-SV(s)) described herein can be generated and stored for each of the registered users (e.g., in association with their corresponding user profiles), with permission from the associated user(s). For example, a TD-SV constrained to the term "door" can be stored in association with a first registered user and have corresponding speaker features that are specific to the first registered user—and a TD-SV constrained to the term "door" can be stored in association with a second registered user and have corresponding speaker features that are specific to the second registered user. TD-SV techniques described herein can be utilized to authenticate an utterance as being from a particular user (instead of from another registered user or a guest user). Optionally, TI-SV techniques, speaker verification, facial verification, and/or other verification technique (s) (e.g., PIN entry) can additionally or alternatively be utilized in authenticating a particular user.

Additional and/or alternative assistant devices may be provided and, in some of those implementations, speaker features for particular TD-SVs for a user can be shared amongst assistant devices for which the user is a registered user. In various implementations, the assistant device 110 may optionally operate one or more other applications that are in addition to automated assistant client 104, such as a message exchange client (e.g., SMS, MMS, online chat), a browser, and so forth. In some of those various implementations, one or more of the other applications can optionally interface (e.g., via an application programming interface) with the automated assistant 100, or include their own instance of an automated assistant application (that may also interface with the cloud-based automated assistant component(s) 140).

Automated assistant 100 engages in human-to-computer dialog sessions with a user via user interface input and output devices of the client device 110. To preserve user privacy and/or to conserve resources, in many situations a user must often explicitly invoke the automated assistant 100 before the automated assistant will fully process a spoken utterance. The explicit invocation of the automated assistant 100 can occur in response to certain user interface input received at the assistant device 110. For example, user interface inputs that can invoke the automated assistant 100 via the assistant device 110 can optionally include actuations of a hardware and/or virtual button of the assistant device 110. Moreover, the automated assistant client can include one or more local engines, such as an invocation engine that is operable to detect the presence of one or more spoken general invocation wakewords. The invocation engine can invoke the automated assistant 100 in response to detection of one of the spoken invocation wakewords. For example, the invocation engine can invoke the automated assistant 100 in response to detecting a spoken invocation wakeword such as "Hey Assistant," "OK Assistant", and/or "Assistant". The invocation engine can continuously process (e.g., if not in an "inactive" mode) a stream of audio data frames that are based on output from one or more microphones of the assistant device 110, to monitor for an occurrence of a spoken invocation phrase. While monitoring for the occurrence of the spoken invocation phrase, the invocation engine discards (e.g., after temporary storage in a buffer) any audio data frames that do not include the spoken invocation phrase. However, when the invocation engine detects an occurrence of a spoken invocation phrase in processed audio data frames, the invocation engine can invoke the automated assistant 100. As used herein, "invoking" the automated assistant 100 can include causing one or more previously inactive functions of the automated assistant 100 to be activated. For example, invoking the automated assistant 100 can include causing one or more local engines and/or cloud-based automated assistant components 140 to further process audio data frames based on which the invocation phrase was detected, and/or one or more following audio data frames (whereas prior to invoking no further processing of audio data frames was occurring). For instance, local and/or cloud-based components can process captured audio data using an ASR model in response to invocation of the automated assistant 100.

The automated assistant client 120 in FIG. 1 is illustrated as including an automatic speech recognition (ASR) engine 122, a natural language understanding (NLU) engine 124, a text-to-speech (TTS) engine 126, a fulfillment engine 128, and an authentication engine 130. In some implementations, one or more of the illustrated engines can be omitted (e.g., instead implemented only by cloud-based automated assistant component(s) 140) and/or additional engines can be provided (e.g., an invocation engine described above).

The ASR engine 122 can process audio data that captures a spoken utterance to generate a recognition of the spoken utterance. For example, the ASR engine 122 can process the audio data utilizing one or more ASR machine learning models to generate a prediction of recognized text that corresponds to the utterance. In some of those implementations, the ASR engine 122 can generate, for each of one or more recognized terms, a corresponding confidence measure that indicates confidence that the predicted term corresponds to the spoken utterance.

The TTS engine 126 can convert text to synthesized speech, and can rely on one or more speech synthesis neural network models in doing so. The TTS engine 126 can be utilized, for example, to convert a textual response into audio data that includes a synthesized version of the text, and the synthesized version audibly rendered via hardware speaker(s) of the assistant device 110.

The NLU engine 124 determines semantic meaning(s) of audio and/or text converted from audio by the ASR engine, and determines assistant action(s) that correspond to those semantic meaning(s). In some implementations, the NLU engine 124 determines assistant action(s) as intent(s) and/or parameter(s) that are determined based on recognition(s) of the ASR engine 122. In some situations, the NLU engine 124 can resolve the intent(s) and/or parameter(s) based on a single utterance of a user and, in other situations, prompts can be generated based on unresolved intent(s) and/or parameter(s), those prompts rendered to the user, and user response(s) to those prompt(s) utilized by the NLU engine 124 in resolving intent(s) and/or parameter(s). In those situations, the NLU engine 124 can optionally work in concert with a dialog manager engine (not illustrated) that determines unresolved intent(s) and/or parameter(s) and/or generates corresponding prompt(s). The NLU engine 124 can utilize one or more NLU machine learning models in determining intent(s) and/or parameter(s).

The fulfillment engine 128 can cause performance of assistant action(s) that are determined by the NLU engine 124. For example, if the NLU engine 124 determines an assistant action of "turning on the kitchen lights", the fulfillment engine 128 can cause transmission of corresponding data (directly to the lights or to a remote server associated with a manufacturer of the lights) to cause the "kitchen lights" to be "turned on". As another example, if the NLU engine 124 determines an assistant action of "provide a summary of the user's meetings for today", the fulfillment engine 128 can access the user's calendar, summarize the user's meetings for the day, and cause the summary to be visually and/or audibly rendered at the assistant device 110.

The authentication engine 130 is illustrated in FIG. 1 as including a comparison module 132, an utterance features module 134, other module(s) 136, and speaker features module 138. The authentication engine 130 can include additional or alternative modules in other implementations. The authentication engine 130 can determine whether to authenticate a spoken utterance for a particular user that is registered with the assistant device 110.

The speaker features module 138 can generate speaker features, for each of one or more particular TD-SVs for a user, using instances of audio data that each capture a corresponding spoken utterance of the user during normal non-enrollment interactions with an automated assistant via one or more respective assistant devices. For example, the speaker features module 138 can utilize a portion of an instance of audio data that captures a spoken utterance, in generating speaker features for a TD-SV for a user, in response to: (a) determining that recognized term(s) (determined using speech recognition performed on the audio data) for the spoken utterance captured by that portion correspond to the particular TD-SV; and (b) determining that an authentication measure, for the user and for the spoken utterance, satisfies a threshold that indicates sufficient confidence that it is the user who spoke the spoken utterance.

In generating speaker features for a TD-SV, the speaker features module 138 can process the portion of audio data using one of the one or more TD-SV model(s) 152A-N that corresponds to the TD-SV. In some implementations, a single of the TD-SV model(s) 152A-N can be used for the TD-SV and for each of a plurality of additional TD-SVs. For example, the same single TD-SV model can be utilized for all TD-SVs, or for a subset that includes multiple of the TD-SVs. In some other implementations, a single of the TD-SV model(s) 152A-N can be used for the TD-SV only. For example, the single TD-SV model can be trained based on utterances, of multiple users, where those utterances are constrained to those including the term(s) of the TD-SV and/or phonetically similar term(s). The speaker features module 138 can store generated speaker features for a TD-SV in association with the user and in association with the TD-SV. For example, the speaker features module can store the generated speaker feature and the associations in TD-SV features database 154, which can optionally be local to the assistant device 110. In some implementations, the speaker features module 138 can perform at least some aspects of at least blocks 268, 270, and 272 of method 200 of FIG. 2 (described below).

The utterance features module 134 can generate utterance features, for a spoken utterance and for each of one or more particular TD-SVs, using corresponding portions of audio data that each capture corresponding term(s) for the TD-SV. For example, the utterance features module 134 can utilize a portion of an instance of audio data that captures a spoken utterance, in generating speaker features for a TD-SV for a user, in response to determining that recognized term(s) (determined using speech recognition performed on the audio data) for the spoken utterance captured by that portion correspond to the particular TD-SV.

In generating utterances features for a TD-SV, the utterance features module 134 can process the portion of audio data using one of the one or more TD-SV model(s) 152A-N that corresponds to the TD-SV. In some implementations, the utterance features module 134 can perform at least aspects of at least blocks 462, 466, and the processing portion of block 464 of method 400 of FIG. 4 (described below).

The comparison module 132 can compare each of one or more utterance features generated by the utterance features module 134 for an utterance to their corresponding speaker features for corresponding TD-SV(s). For example, three utterance features can be generated by the utterance features module 134 for an utterance, each corresponding to a different TD-SV. In such an example, the comparison module 132 can compare each of the three utterance features to a corresponding one of the speaker features, stored in TD-SV features database 154, to generate a corresponding distance metric. The distance metrics can each indicate how closely the utterance features match the corresponding speaker features. In some implementations, the speaker comparison module 132 can perform at least aspects of at least the comparison portion of block 464 of method 400 of FIG. 4 (described below).

The authentication engine 130 can determine whether to authenticate a user, for a spoken utterance, based at least in part on the comparison(s) performed by the comparison module 132. In some implementations, the authentication engine 130 can, in determining whether to authenticate a user, additionally or alternatively utilize metric(s) generated by other module(s) 136 for other verification(s). For example, the other module(s) can generate metric(s) related to text-independent speaker verification, fingerprint verification, facial verification, and/or other verification(s).

Cloud-based automated assistant component(s) 140 are optional and can operate in concert with corresponding component(s) of the assistant client 120 and/or can be utilized (always or selectively) in lieu of corresponding component(s) of the assistant client 120. In some implementations, cloud-based component(s) 140 can leverage the virtually limitless resources of the cloud to perform more robust and/or more accurate processing of audio data, and/or other data, relative to any counterparts of the automated assistant client 120. In various implementations, the assistant device 110 can provide audio data and/or other data to the cloud-based automated assistant components 140 in response to an invocation engine detecting a spoken invocation phrase, or detecting some other explicit invocation of the automated assistant 100.

The illustrated cloud-based automated assistant components 140 include a cloud-based ASR engine 142, a cloud-based NLU engine 144, a cloud-based TTS engine 146, a cloud-based fulfillment engine 148, and a cloud-based authentication engine 150. These components can perform similar functionality to their automated assistant counterparts (if any). In some implementations, one or more of the illustrated cloud-based engines can be omitted (e.g., instead implemented only by automated assistant client 120) and/or additional cloud-based engines can be provided.

Figure 2:
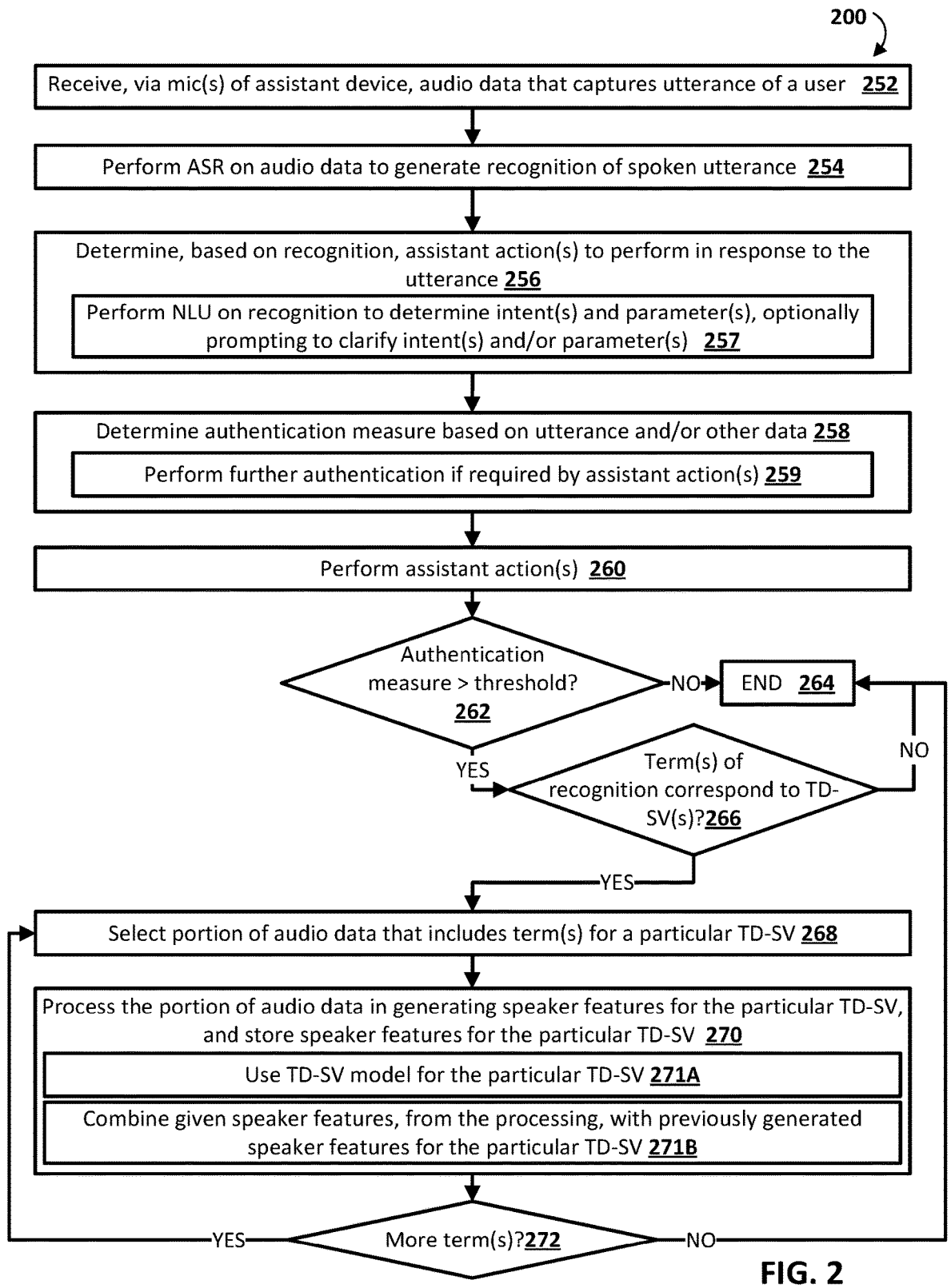
FIG. 2 is a flowchart illustrating an example method of automatically generating speaker features for each of one or more particular text-dependent speaker verifications, in accordance with various implementations.

FIG. 2 is a flowchart illustrating an example method 200 of automatically generating speaker features for each of one or more particular text-dependent speaker verifications, in accordance with various implementations. For convenience, the operations of the flow chart are described with reference to a system that performs the operations. This system may include various components of various computer systems, such as one or more components of automated assistant 100. Moreover, while operations of method 200 are shown in a particular order, this is not meant to be limiting. One or more operations may be reordered, omitted or added.

At block 252, the system receives, via microphone(s) of an assistant device, audio data that captures a spoken utterance of a user.

At block 254, the system performs automatic speech recognition (ASR) on audio data to generate a recognition of the spoken utterance.

At block 256, the system determines, based on the recognition of block 254, assistant action(s) to perform in response to the utterance. In some implementations, block 256 can include sub-block 257. In sub-block 257, the system performs natural language understanding (NLU) on the transcription to determine intent(s) and parameter(s). In some of those implementations, the system optionally prompts the first user (e.g., utilizing visual and/or audible prompt(s)) to clarify intent(s) and/or parameter(s). For example, the user can be prompted to disambiguate between a "play music" intent and a "play video" intent. As another example, the user can be prompted to disambiguate between a "smart device 1" parameter and a "smart device 2" parameter.

At block 258, the system determines an authentication measure, for the user, based on the utterance captured at block 252 and/or other data. For example, the system can perform a particular TD-SV based on the audio data that captures the utterance and can generate the authentication measure based on whether and/or how closely the particular TD-SV matches corresponding speaker features for the user. As another example, the system can additionally or alternatively perform a general invocation TD-SV based on audio data that precedes the spoken utterance and can generate the authentication measure based on whether and/or how closely the particular TD-SV matches a corresponding speaker feature for the user. As another example, the system can additionally or alternatively perform text-independent speaker verification (TI-SV) based on the audio data that captures the utterance and can generate the authentication measure based on whether and/or how closely the TI-SV matches corresponding speaker features for the user. As another example, the system can additionally or alternatively determine the authentication measure based on facial verification (e.g., based on image(s) from a camera of the assistant device) and/or fingerprint verification (e.g., based on date from a fingerprint sensor of the assistant device).

In various implementations, the system can determine the authentication measure based on one or more of: how closely corresponding verification(s) match corresponding data for the user (i.e., with closer matching verifications leading to an authentication measure more indicative of authentication); how many different verification(s) occurred (i.e., with more verification(s) leading to an authentication measure more indicative of authentication); and/or which verification(s) occurred (i.e., some verification(s) can be weighted more heavily than others).

In some implementations, block 258 includes sub-block 259 in which the system performs further authentication if such further authentication is required by one or more of the assistant action(s) determined at block 256. For example, if the assistant action requires a greater degree of authentication than that indicated by the utterance of block 252 and/or currently available other data, the system can prompt the user to provide utterance(s) and/or data that enable further verification(s). For instance, no verification may be performable based on the utterance and/or currently available other data, and the system can prompt for the user to speak a general invocation wakeword and/or speak (or otherwise input) a PIN or other passcode. Also, for instance, only the general invocation TD-SV verification may be performable based on the utterance and/or currently available other data, and the action may require an additional form of verification (e.g., facial or fingerprint verification), and the system can prompt for such additional form of verification.

At block 260, the system performs the assistant action(s). For example, the assistant action(s) can include generating and causing rendering of audible and/or visual user interface output that is responsive to the utterance, controlling smart device(s), placing a phone call (e.g., using VoIP), sending a message to another user, and/or performing other action(s).

At block 262, the system determines whether the authentication measure, of block 258, satisfies a threshold. It is noted that in some implementations the threshold of block 262 can be the same threshold as that required by the assistant action(s) at block 259, if any is required at block 259 (e.g., the authentication measure can still be determined and can still satisfy a threshold even if the assistant action(s) don't require authentication). In some other implementations, the threshold of block 262 can be different than that required by the assistant action(s) at block 259, if any is required at block 259.

If, at block 262, the system determines the authentication measure fails to satisfy the threshold, the system can proceed to block 264 and method 200 ends.

If, at block 262, the system determines the authentication measure satisfies the threshold, the system proceeds to block 266 and the system determines if term(s) of the recognition correspond to one or more TD-SV(s) for the user. For example, the utterance can be "turn up the kitchen thermostat" and the system can determine that "turn up" corresponds to a first particular TD-SV for the user, "kitchen" corresponds to a second particular TD-SV for the user, "thermostat" corresponds to a third particular TD-SV for the user, and "kitchen thermostat" corresponds to a fourth particular TD-SV for the user. As another example, the utterance can be "what time is it" and the system can determine that no terms correspond to any particular TD-SV for the user.

If, at block 264, the system determines no term(s) of the recognition correspond to one or more TD-SV(s) for the user, the system proceeds to block 264 and method 200 ends.

If, at block 264, the system determines term(s) of the recognition correspond to one or more TD-SV(s) for the user, the system proceeds to block 268.

At block 268, the system selects a portion of audio data that includes the term(s) for a particular TD-SV. For example, the portion can be selected based on the ASR, of block 254, indicating that the portion includes the term(s) for the particular TD-SV.

At block 270, the system processes the portion of audio data in generating speaker features for the particular TD-SV. For example, the system can process the portion of audio data to generate, directly based on the processing, given speaker features for the portion of audio data. The speaker features for the particular TD-SV can be generated based on the generated given speaker features and, optionally, based on previously generated speaker features from processing of prior portion(s) of audio data that are from the user, that include the term(s) of the particular TD-SV, and that satisfy the authentication threshold. When the speaker features conform to the given speaker features, it can be, for example, a result of the portion of audio data being the first portion that is from the user, that includes the term(s) of the particular TD-SV, and that satisfies the authentication threshold. At block 270, the system further stores the speaker features in association with the particular TD-SV and in association with the user. The speaker features can be stored, for example, locally on the assistant device. In some implementations, the speaker features can additionally or alternatively be stored in remote assistant server(s) but access-restricted for use only in association with the user and/or shared (e.g., via local Wi-Fi or other local connection (s)) with other assistant device(s) for which the user is also a registered user.

In some implementations, block 270 includes sub-block 271A and/or sub-block 271B.

At sub-block 271A, the system uses a TD-SV model, that is for the particular TD-SV, in processing the portion of audio data. Given speaker features, for the portion of audio data, can then be based on (e.g., strictly correspond to) values from a set of activations of a layer of the TD-SV model after processing of the audio data. The TD-SV model that is for the particular TD-SV can be a neural network model and can be utilized only for the particular TD-SV or can instead also be used for multiple additional (e.g., all) particular TD-SVs.

At sub-block 271B, the system combines given speaker features, generated from the processing of the portion of audio data, with previously generated speaker features for the particular TD-SV for the user. For example, the previously generated speaker features for the particular TD-SV for the user can be averaged and/or otherwise combined with the given speaker features.

At block 272, the system determines whether there are more term(s), from those identified at block 266, that have not yet been processed. If so, the system performs another iteration of blocks 268 and 270 for another particular TD-SV for the user, and using the portion of audio data that include(s) those term(s).

Figure 3A:
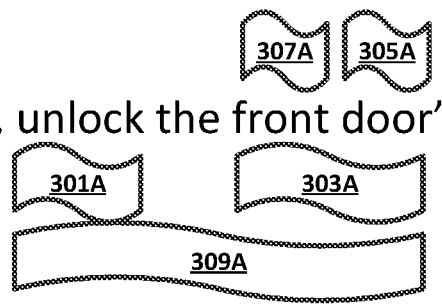
FIG. 3A illustrates example spoken utterances of a user that were each provided when the user was authenticated with an automated assistant.
Figure 3A:
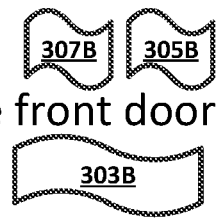
Figure 3A:
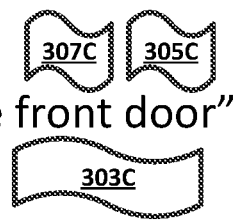
Figure 3A:
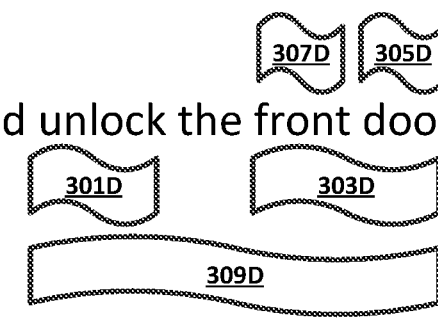
Figure 3A:

Turning now to FIG. 3A, five example spoken utterances 300A, 300B, 300C, 300D, and 300E are illustrated. Each of the example spoken utterances 300A-E are from the same user and were each provided when the user was authenticated with an automated assistant. Also illustrated in FIG. 3A are various representations of portions of audio data for the spoken utterances 300A-E, where each of the portions of audio data correspond to term(s) that correspond to a particular TD-SV for the user. More particularly: portions 301A, 301D, and 301E correspond to the term "unlock"; portions 303A, 303B, 303C, and 303D correspond to the terms "front door"; portions 305A, 305B, 305C, 305D, and 305E correspond to the term "door"; portions 307A, 307B, 307C, and 307D correspond to the term "front"; and portions 309A and 309D correspond to the terms "unlock the front door".

Figure 3B:
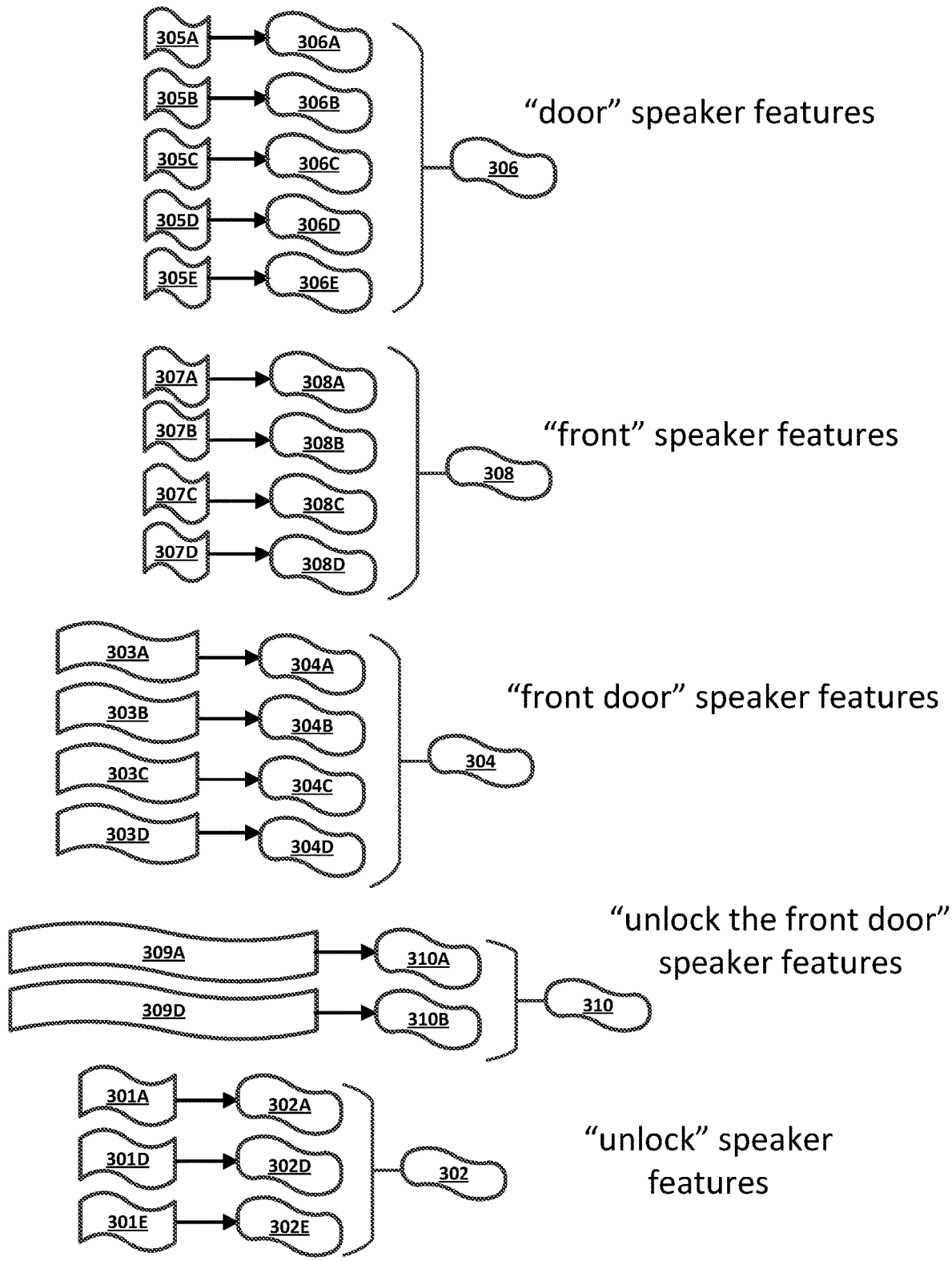
FIG. 3B illustrate examples of utilizing audio data, for the spoken utterances of FIG. 3A, in automatically generating speaker features for multiple different particular text-dependent speaker verifications.

Turning now to FIG. 3B, examples are illustrated of utilizing the portions of audio data represented in FIG. 3A in automatically generating speaker features for multiple different particular TD-SVs.

In FIG. 3B, portions 305A-E of audio data corresponding to "door" are utilized to generate speaker features 306 that are for a particular TD-SV, for the user, that is constrained to "door". More particularly, portion 305A is illustrated as being processed to generate given speaker features 306A that correspond to portion 305A, portion 305B is illustrated as being processed to generate given speaker features 306B that correspond to portion 305B, portion 305C is illustrated as being processed to generate given speaker features 306C that correspond to portion 305C, portion 305D is illustrated as being processed to generate given speaker features 306D that correspond to portion 305D, and portion 305E is illustrated as being processed to generate given speaker features 306E that correspond to portion 305E. The processing of the portions 305A-E can be, for example, using a TD-SV model that is utilized only for the particular TD-SV or using a TD-SV model that is utilized for the particular TD-SV and also for multiple additional (e.g., all) particular TD-SVs. The given speaker features 306A-E can be combined to generate speaker features 306. For example, the speaker features 306 can be an average of the given speaker features 306A-E. Optionally, in averaging or otherwise combining the given speaker features 306A-E, the given speaker features 306A-E can be weighted based on one or more factors. For example, any outlier(s) can be weighted less heavily (e.g., weight lessened in proportion to extent of outlying) or even not considered (i.e., effectively weighted "0"). As another example, the given speaker features 306A-E can be weighted based on their corresponding authentication measure. For instance, given speaker features 306A can be weighted more heavily than given speaker features 306B based on given speaker features 306A being based on a spoken utterance 300A and given speaker features 306B being based on a spoken utterance 300B, and spoken utterance 300A being provided when a greater authentication measure was determined, relative to an authentication measure determined when spoken utterance 300B was provided.

In FIG. 3B, portions 307A-D of audio data corresponding to "front" are utilized to generate speaker features 306 that are for a particular TD-SV, for the user, that is constrained to "front". More particularly, portion 307A is illustrated as being processed to generate given speaker features 308A that correspond to portion 307A, portion 307B is illustrated as being processed to generate given speaker features 308B that correspond to portion 307B, portion 307C is illustrated as being processed to generate given speaker features 308C that correspond to portion 307C, and portion 307D is illustrated as being processed to generate given speaker features 308D that correspond to portion 307D. The processing of the portions 307A-D can be, for example, using a TD-SV model that is utilized only for the particular TD-SV or using a TD-SV model that is utilized for the particular TD-SV and also for multiple additional (e.g., all) particular TD-SVs. The given speaker features 308A-D can be combined to generate speaker features 308. For example, the speaker features 308 can be an average of the given speaker features 308A-E, optionally discarding any outlier(s) of the given speaker features 308A-E.

In FIG. 3B, portions 303A-D of audio data corresponding to "front door" are utilized to generate speaker features 304 that are for a particular TD-SV, for the user, that is constrained to "front door". Notably, speaker features 304 are for a particular TD-SV that is constrained to "front door", whereas speaker features 306 are for a separate particular TD-SV that is constrained to "door" standing alone and speaker features 308 are for a further separate particulate TD-SV that is constrained to "front" standing alone. In FIG. 3B, portion 303A is illustrated as being processed to generate given speaker features 304A that correspond to portion 303A, portion 303B is illustrated as being processed to generate given speaker features 304B that correspond to portion 303B, portion 303C is illustrated as being processed to generate given speaker features 304C that correspond to portion 303C, and portion 303D is illustrated as being processed to generate given speaker features 304D that correspond to portion 303D. The processing of the portions 303A-D can be, for example, using a TD-SV model that is utilized only for the particular TD-SV or using a TD-SV model that is utilized for the particular TD-SV and also for multiple additional (e.g., all) particular TD-SVs. The given speaker features 304A-D can be combined to generate speaker features 304. For example, the speaker features 304 can be an average of the given speaker features 304A-E, optionally discarding any outlier(s) of the given speaker features 304A-E.

In FIG. 3B, portions 309A and 309B of audio data corresponding to "unlock the front door" are utilized to generate speaker features 310 that are for a particular TD-SV, for the user, that is constrained to "unlock the front door". More particularly, portion 309A is illustrated as being processed to generate given speaker features 310A that correspond to portion 309A and portion 309B is illustrated as being processed to generate given speaker features 310B that correspond to portion 309B. The processing of the portions 309A and 309B can be, for example, using a TD-SV model that is utilized only for the particular TD-SV or using a TD-SV model that is utilized for the particular TD-SV and also for multiple additional (e.g., all) particular TD-SVs. The given speaker features 310A and 310B can be combined to generate speaker features 310. For example, the speaker features 304 can be an average of the given speaker features 310A and 310B.

In FIG. 3B, portions 301A, 301D, and 301E of audio data corresponding to "unlock" are utilized to generate speaker features 302 that are for a particular TD-SV, for the user, that is constrained to "unlock". More particularly, portion 301A is illustrated as being processed to generate given speaker features 302A that correspond to portion 301A, portion 301D is illustrated as being processed to generate given speaker features 302D that correspond to portion 301D, and portion 301E is illustrated as being processed to generate given speaker features 302E that correspond to portion 301E. The processing of the portions 301A, 301D, and 301E can be, for example, using a TD-SV model that is utilized only for the particular TD-SV or using a TD-SV model that is utilized for the particular TD-SV and also for multiple additional (e.g., all) particular TD-SVs. The given speaker features 302A, 302D, and 302E can be combined to generate speaker features 302. For example, the speaker features 302 can be an average of the given speaker features 301A, 301D, and 301E, optionally discarding any outlier.

In some implementations, the five separate particular TD-SVs can each be associated with a corresponding weighting that is utilized when the particular TD-SV is being utilized in authenticating a user. Put another way, some of the particular TD-SVs can be given more weight than other of the particular TD-SVs. In some of those implementations, the weight given to a particular TD-SV can be a function of a quantity of portion(s) of audio data on which it's corresponding speaker features are based, how many term(s) in sequence it corresponds to (e.g., whether it's constrained to single term(s) only, sequence(s) each of two terms only, etc.), and/or other factors. As one example, the TD-SV for "door" can have a stronger weighting than the TD-SV for "front" at least based on the speaker features for the TD-SV for "door" being based on five portions of audio data, whereas the speaker features for the TD-SV for "front" are based on only four portions of audio data. As another example, the TD-SV for "front door" can have a stronger weighting than the TD-SV for "front" at least based on the TD-SV for "front door" being constrained to a sequence of two-terms, whereas the TD-SV for "front" is constrained to only a single term.

Figure 4:
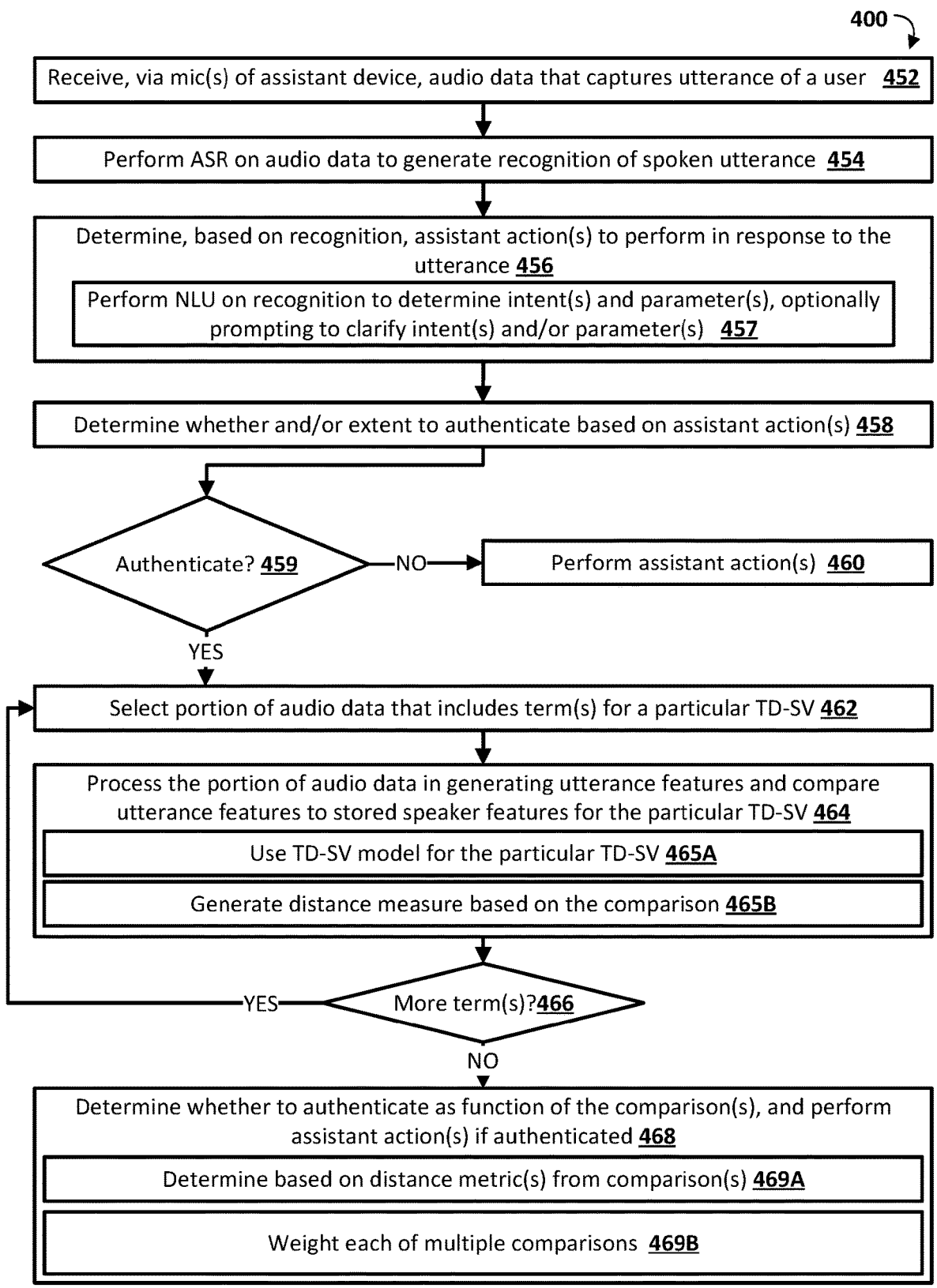
FIG. 4 is a flowchart illustrating an example method of authenticating a user using one or more particular text-dependent speaker verifications, in accordance with various implementations.

FIG. 4 is a flowchart illustrating an example method 400 of authenticating a user using one or more particular text-dependent speaker verifications, in accordance with various implementations. For convenience, the operations of the flow chart are described with reference to a system that performs the operations. This system may include various components of various computer systems, such as one or more components of automated assistant 110. Moreover, while operations of method 400 are shown in a particular order, this is not meant to be limiting. One or more operations may be reordered, omitted or added.

At block 452, the system receives, via microphone(s) of an assistant device, audio data that captures a spoken utterance of a user.

At block 454, the system performs automatic speech recognition (ASR) on audio data to generate a recognition of the spoken utterance.

At block 456, the system determines, based on the recognition of block 454, assistant action(s) to perform in response to the utterance. In some implementations, block 456 can include sub-block 457. In sub-block 457, the system performs natural language understanding (NLU) on the transcription to determine intent(s) and parameter(s). In some of those implementations, the system optionally prompts the first user (e.g., utilizing visual and/or audible prompt(s)) to clarify intent(s) and/or parameter(s).

At block 458, the system determines, based on the assistant action(s) determined at block 456, whether and/or to what extent to authenticate the user who spoke the utterance. For example, if the assistant action(s) are restricted to intent(s) and/or parameter(s) that do not require any personal data to perform (or do not require any of certain type(s) of personal data), the system can determine no assistant authentication is required. On the other hand, for other type(s) of assistant actions, the system can determine that authentication is required and can optionally determine the extent of the authentication that is required. For example, the system can determine that some or all smart device control assistant actions require authentication. Further, the system can determine that certain smart device control assistant action(s) (e.g., unlocking a smart lock and/or controlling a kitchen appliance) require a greater degree of authentication than other smart device control assistant action(s) (e.g., turning on a light). Which assistant action(s) require authentication and/or an extent of the authentication can be stored on the assistant device and/or in remote assistant server(s) and can be manually set for a population of users or set on a per-user basis (e.g., based on input(s) by the user that dictate the authentication required).

If, at block 459, the system determines authentication is not required, the system can optionally proceed to block 460 and perform the assistant action(s) 460 without authentication.

If, at block 459, the system determines authentication is required, the system proceeds to block 462 and selects a portion of audio data that includes the term(s) for a particular TD-SV for the user. For example, the portion can be selected based on the ASR, of block 454, indicating that the portion includes the term(s) for the particular TD-SV.

At block 464, the system processes the portion of audio data in generating utterance features for the particular TD-SV, and compares the generated utterance features to previously generated speaker features for the particular TD-SV (e.g., generated based on method 300 of FIG. 3).

In some implementations, block 464 includes sub-block 465A and/or sub-block 465B. At sub-block 465A, the system uses a TD-SV model, that is for the particular TD-SV, in processing the portion of audio data. Utterance features, for the portion of audio data, can then be based on (e.g., strictly correspond to) values (e.g., an embedding) from a set of activations of a layer of the TD-SV model after processing of the audio data. The TD-SV model that is for the particular TD-SV can be a neural network model and can be utilized only for the particular TD-SV or can instead also be used for multiple additional (e.g., all) particular TD-SVs.

At sub-block 465B, the system, in comparing the generated utterance features to previously generated speaker features for the particular TD-SV, generates a distance measure. For example, the utterance features can be an embedding and be compared to speaker features for the TD-SV and for the user, that are also an embedding. The comparison can include generating a cosine distance measurement or other distance metric between the two embeddings.

At block 466, the system determines whether there are more term(s), that correspond to an associated particular TD-SV for the user, that have not yet been processed. If so, the system performs another iteration of blocks 462 and 464 for another particular TD-SV for the user, and using the portion of audio data that include(s) those term(s).

If, at block 466, the system determines there are not more term(s) that have not been processed, the system proceeds to block 468. At block 468, the system determines whether to authenticate the user as a function of the comparison(s) of the one or more iterations of block 464. For example, if there were three iterations of block 464 for three separate TD-SVs of the user, the system can determine whether to authenticate as a function of all three of the comparisons. For instance, authentication of the user can be contingent on each of the comparisons indicating at least a threshold degree of similarity and/or contingent on an overall comparison indicating at least a threshold degree of similarity, where the overall comparison is based on an average or other combination of the three individual comparisons. Optionally, when the three individual comparisons are average or otherwise combined, they can each be weighted based on the optionally weightings that are optionally assigned to the corresponding TD-SVs for the user, as described herein. At block 468, the system can determine whether to authenticate the user based on the comparison(s) and optionally based on any additional verification(s) that are performable based on available data. For example, the system can also utilize TI-SV in determining whether to authenticate at block 468.

At block 468, the system also performs the assistant action(s) if it is determined to authenticate the user. If the system determines to not authenticate the user, the system can prevent performance of the assistant action(s), optionally notifying the user that he/she cannot be authenticated. Optionally, if the assistant determines to not authenticate the user as a function of the comparisons(s) and/or other available data, the assistant can prompt the user to provide further input(s) for verification (e.g., prompt for provision of a passcode).

In some implementations, block 468 includes sub-block 469A and/or 469B.

At sub-block 469A, the system determines whether to authenticate based on the comparison(s) based on optionally generated distance metric(s) from the comparison(s). For example, a distance metric can be generated for each of the comparisons, and authentication of the user can be contingent on one or more (e.g., all) of the distance metrics indicating a threshold degree of similarity. As another example, a distance metric can be generated for each of the comparisons, the system can determine an overall distance metric based on averaging and/or otherwise combining the individual distance metrics to generate an overall distance metric, and authentication of the user can additionally or alternatively be contingent on the overall distance metric indicating at least a threshold degree of similarity. Optionally, and as indicated by sub-block 469B in which each of the comparisons is weighted, each of the distance metrics can be weighted differently in the averaging or otherwise combining. For example, a first distance metric can be weighted more heavily than a second distance metric based on the first speaker features utilized in generating the first distance metrics being based on a greater quantity of past spoken utterances of the user than the speaker features utilized in generating the second distance metric. As another example, the first distance metric can additionally or alternatively be weighted more heavily than a second distance metric based on a speech recognition confidence, for term(s) corresponding to the particular TD-SV for the first distance metric, being more indicative of confidence than a speech recognition confidence for second term(s) for the particular TD-SV for the second distance metric. As yet another example, the first distance metric can additionally or alternatively be weighted more heavily than a second distance metric based on the first distance metric being generated for a TD-SV that is for a sequence of term(s) that includes a greater quantity of term(s) than those for the TD-SV utilized in generating the second distance metric.

Figure 5A:
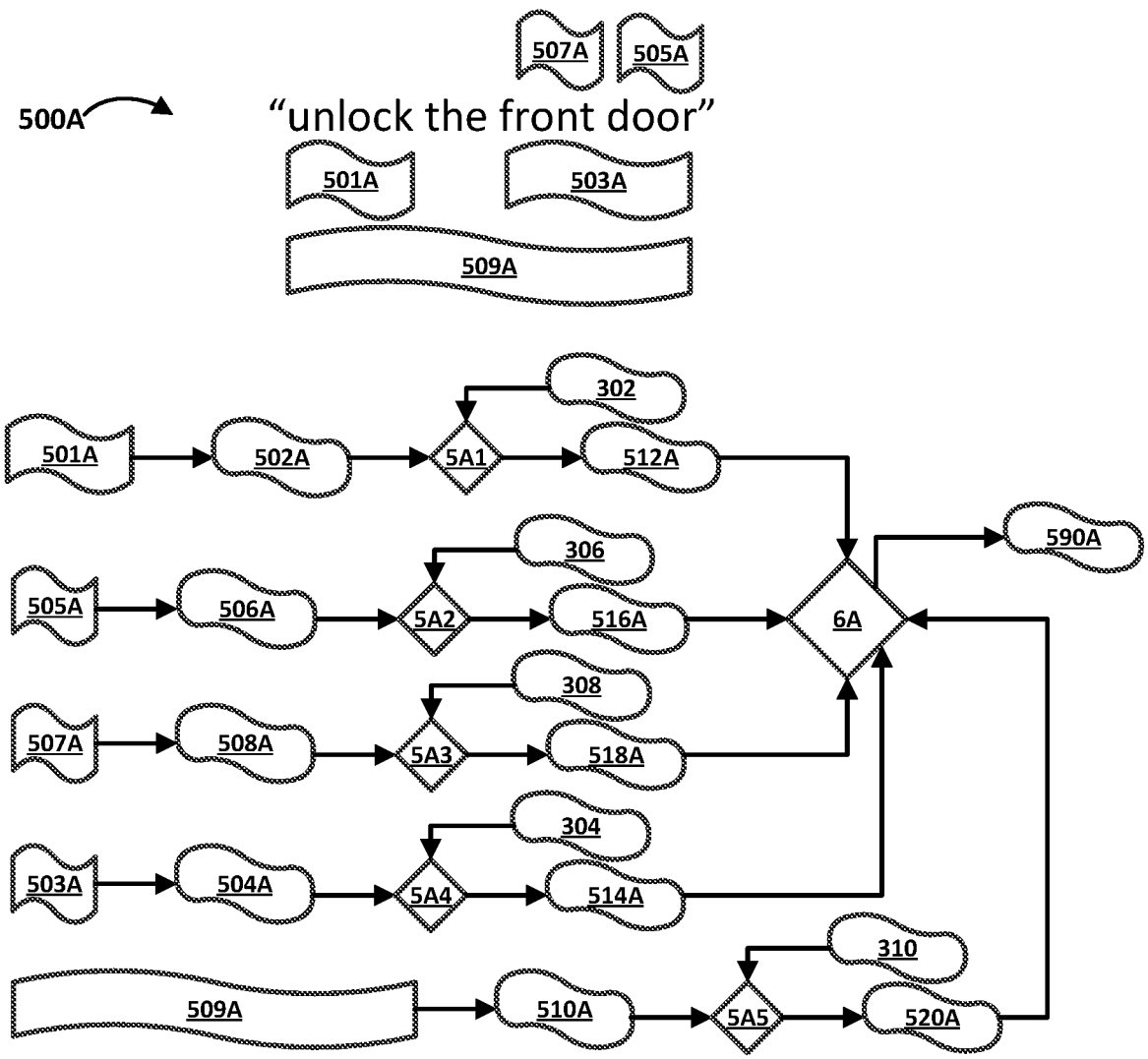
FIG. 5A and FIG. 5B each illustrate an example of a spoken utterance, and using multiple particular text-dependent speaker verifications in determining whether to verify the spoken utterance as being spoken by a particular user.

Turning now to FIG. 5A, an example spoken utterance 500A of a user of "unlock the front door" is illustrated. Also illustrated in FIG. 5A is a portion 501A of audio data that captures the spoken utterance 500A and that corresponds to "unlock", a portion 503A of that audio data that corresponds to "front door", a portion 505A of that audio data that corresponds to "door", a portion 507A of that audio data that corresponds to "front", and a portion 509A of that audio data that corresponds to "unlock the front door". The portions can be determined to correspond to the corresponding term(s) based on ASR of the audio data indicating such.

Also illustrated in FIG. 5A is an example of processing the portions 501A, 503A, 505A, 507A, and 509A to generate corresponding utterance features 502A, 504A, 506A, and 508A. Further illustrated in FIG. 5A is: a first comparison 5A1 of the utterance features 502A to corresponding speaker features 302 (FIG. 3B) for a TD-SV of the user constrained to the term "unlock", to generate a first distance metric 512A; a second comparison 5A2 of the utterance features 505A to corresponding speaker features 306 (FIG. 3B) for a TD-SV of the user constrained to the term "door", to generate a second distance metric 516A; a third comparison 5A3 of the utterance features 508A to corresponding speaker features 308 (FIG. 3B) for a TD-SV of the user constrained to the term "front", to generate a third distance metric 518A; a fourth comparison 5A4 of the utterance features 504A to corresponding speaker features 302 (FIG. 3B) for a TD-SV of the user constrained to the term "unlock", to generate a fourth distance metric 514A; and a fifth comparison 5A5 of the utterance features 510A to corresponding speaker features 310 (FIG. 3B) for a TD-SV of the user constrained to the term "front door", to generate a fifth distance metric 520A.

Yet further illustrated in FIG. 5A is a decision 590A to authenticate the user as a function 6A of the first distance metric 512A, the second distance metric 516A, the third distance metric 518A, the fourth distance metric 514A, and the fifth distance metric 520A. For example, determining to authenticate the user can be contingent on: at least N of (e.g., 2 of) the metrics satisfying a threshold and/or an average (optionally weighted as described herein) of at least N of (e.g., 2 of) the metrics satisfying a threshold. FIG. 5A illustrates generating and utilizing, for an utterance 500A, utterance features based on overlapping TD-SVs. For example, the TD-SV constrained to "front" overlaps with the TD-SV constrained to "front door", the TD-SV constrained to "door" also overlaps with "front door", and the TD-SV constrained to "unlock the front door" overlaps with all other pertinent TD-SVs, portion 507A overlaps with portion 503A, portion 505A overlaps with portion 503A, portion 509A overlaps with all other portions). However, some implementations can prevent or limit overlapping TD-SVs in determining whether to authenticate a user for an utterance. For example, implementations can, for an utterance, utilize only the set of TD-SV(s) that are non-overlapping with one another and that collectively provide the maximal coverage over the query (e.g., maximal coverage on a quantity of terms basis, a quantity of characters basis, and/or a quantity of syllables basis). If more than one set of TD-SV(s) are non-overlapping and provide the same amount of coverage over the query, optionally the set with lesser TD-SV(s) and/or TD-SV(s) based on a greater quantity of past utterances can be utilized.

Figure 5B:
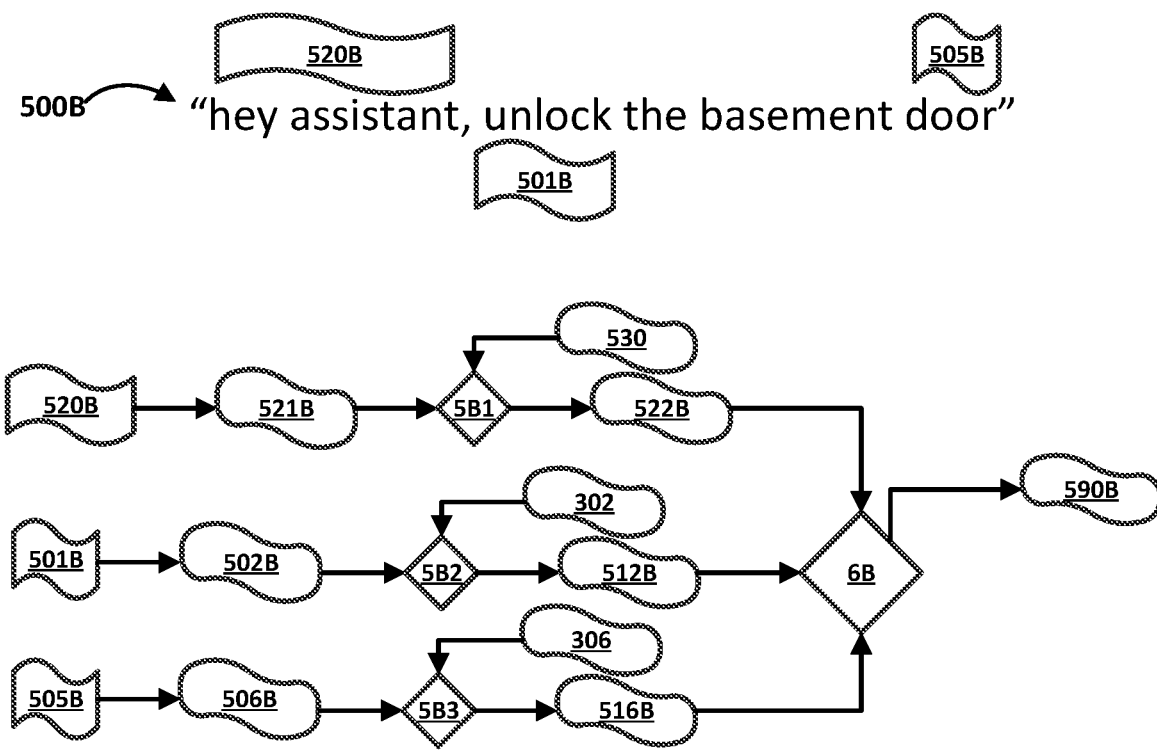

Turning now to FIG. 5B, an example spoken utterance 500B of a user of "hey assistant, unlock the basement door" is illustrated. Also illustrated in FIG. 5B is a portion 501B of audio data (that captures the spoken utterance 500B) that corresponds to "unlock", a portion 505B of that audio data that corresponds to "door", and a portion 520B of that audio data (or preceding audio data) that corresponds to "hey assistant". The portions of the audio data can be determined to correspond to the corresponding term(s) based on ASR indicating such. In some implementations "hey assistant" is an invocation wakeword for the automated assistant. In some of those implementations, the portion 520B can be determined to correspond to "hey assistant" based on the portion 520B causing triggering of a wakeword detector (e.g., based on output generated using a wakeword neural network model based on processing of the portion 520B).

Also illustrated in FIG. 5B is an example of processing the portions 520B, 501B, and 505B to generate corresponding utterance features 521B, 502B, and 506B. Further illustrated in FIG. 5B is a first comparison 5B1 of the utterance features 502A to corresponding speaker features 530 for a TD-SV of the user, constrained to the term "hey assistant" and optionally other wakeword(s) (e.g., also "OK assistant"), to generate a first distance metric 522B. Optionally, the corresponding speaker features 530 can be generated based on utterances provided by the user in response to prompts during an explicit enrollment procedure. Yet further illustrated in FIG. 5B is a second comparison 5B2 of the utterance features 502B to corresponding speaker features 303 (FIG. 3B) for a TD-SV of the user constrained to the term "unlock", to generate a second distance metric 512B, and a third comparison 5B3 of the utterance features 506B to corresponding speaker features 306 (FIG. 3B) for a TD-SV of the user constrained to the term "door", to generate a third distance metric 516B.

Yet further illustrated in FIG. 5B is a decision 590B to authenticate the user as a function 6B of the first distance metric 522B, the second distance metric 512B, and the third distance metric 516B. For example, determining to authenticate the user can be contingent on: at least N of (e.g., 2 of) the metrics satisfying a threshold and/or an average (optionally weighted as described herein) of at least N of (e.g., 2 of) the metrics satisfying a threshold.

Figure 6:
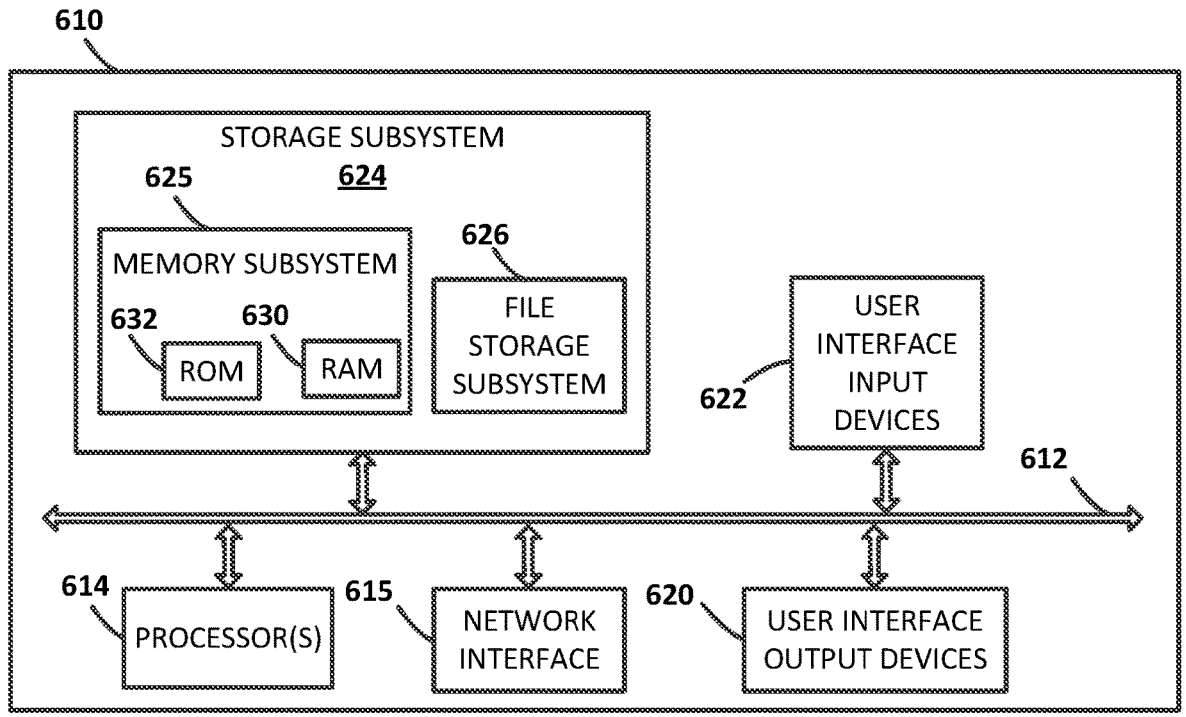
FIG. 6 illustrates an example architecture of a computing device.

FIG. 6 is a block diagram of an example computing device 610 that may optionally be utilized to perform one or more aspects of techniques described herein. In some implementations, one or more of a client computing device, and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of one or more of the methods described herein, and/or to implement various components depicted herein.

These software modules are generally executed by processor 614 alone or in combination with other processors. Memory 625 used in the storage subsystem 624 can include a number of memories including a main random access memory ("RAM") 630 for storage of instructions and data during program execution and a read only memory ("ROM") 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by processor(s) is provided that includes receiving audio data that captures a spoken utterance of a user and performing speech recognition on the audio data to generate a recognition of the spoken utterance. The audio data is detected via one or more microphones of an assistant device of the user. The method further includes determining, based on the speech recognition, an assistant action conveyed by the spoken utterance, and performing the assistant action responsive to receiving the spoken utterance. The method further includes determining that one or more terms of the recognition correspond to a particular text dependent speaker verification (TD-SV) for the user, and determining that an authentication measure, for the user and for the spoken utterance, satisfies a threshold. The one or more terms are separate from any general invocation wake words for the assistant device. The method further includes, in response to determining that the one or more terms of the recognition correspond to the particular TD-SV for the user and in response to determining that the authentication measure satisfies the threshold: processing a portion of the audio data, that corresponds to the one or more terms, in generating speaker features for the particular TD-SV for the user.

These and other implementations disclosed herein can include one or more of the following features.

In some implementations, the method further includes, subsequent to processing the audio data in generating the speaker features for the particular TD-SV for the user: receiving additional audio data that captures an additional spoken utterance of the user, the additional spoken utterance including the one or more terms; processing a given portion of the additional audio data, that corresponds to the one or more terms, in generating utterance features for the portion of the additional audio data; comparing the utterance features to the speaker features for the particular TD-SV for the user; and determining, based on the comparing, whether to authenticate the user for the additional spoken utterance. In some versions of those implementations, the method further includes performing speech recognition on the additional audio data to generate an additional recognition of the additional spoken utterance, and determining that the one or more terms are included in the additional recognition and correspond to the given portion of the additional audio data. In those versions processing the given portion of the additional audio data and comparing the utterance features to the speaker features for the particular TD-SV are responsive to determining that the one or more terms are included in the additional recognition and correspond to the given portion of the additional audio data. In some of those versions, the comparing includes determining a distance measure between the utterance features and the speaker features and, optionally, determining, based on the comparing, whether to authenticate the user for the additional spoken utterance, includes: determining a threshold that is dependent on an additional assistant interaction that is conveyed by the additional spoken utterance; and authenticating the user for the additional spoken utterance only responsive to determining the distance measure satisfies the threshold.

In some implementations, the method further includes, prior to receiving the audio data, generating initial speaker features for the particular TD-SV for the user based on one or more prior instances of audio data that were each determined to include the one or more terms and that were each determined to be authenticated for the user. In some of those implementations, processing the portion of the audio data in generating the speaker features for the particular TD-SV for the user can include modifying the initial speaker features based on processing the portion of the audio data.

In some implementations, the method further includes determining the authentication measure based on: a general invocation TD-SV that is based on processing the audio data or preceding audio data that precedes the audio data; fingerprint verification for the user; facial verification for the user; and/or analysis of a verification code entered by the user. The general invocation TD-SV is for the user and is for one or more of the general invocation wake words for the assistant device.

In some implementations, a method implemented by processor(s) is provided that includes receiving audio data that captures a spoken utterance of a given user and processing a first portion of the audio data to generate first utterance features. The audio data is detected via one or more microphones of an assistant device of the given user. The method further includes performing a first comparison of the first utterance features to first speaker features for a first text dependent speaker verification (TD-SV) for the user, the first TD-SV being dependent on a first set of one or more terms. The method further includes processing a second portion of the audio data to generate second utterance features, the second portion of the audio data being distinct from the first portion of the audio data. The method further includes performing a second comparison of the second utterance features to second speaker features for a second TD-SV for the user, the second TD-SV being dependent on a second set of one or more terms that are distinct from the first set of one or more terms. The method further includes determining, based on both the first comparison and the second comparison, to authenticate the user for the spoken utterance. The method further includes, in response to determining to authenticate the user for the spoken utterance: performing one or more actions, that are based on the spoken utterance.

These and other implementations disclosed herein can include one or more of the following features.

In some implementations, the first portion of the audio data captures a general invocation wake word for the assistant device, and the first set of one or more terms on which the first TD-SV is dependent consists of one or more general invocation wake words for the assistant device. The general invocation wake word is one of the one or more general invocation wake words for the assistant device. In some versions of those implementations, the method further includes, prior to receiving the audio data: performing an enrollment procedure in which multiple utterances of the user are collected in response to one or more prompts to speak the general invocation wakeword; and generating the first speaker features as a function of the multiple utterances. In some additional or alternative versions of those implementations, the second portion of the audio data is non-overlapping with the first portion of the audio data, and the second portion of the audio data is void of any of the one or more general invocation wake words for the assistant device. In some of those additional or alternative versions, the method further includes, prior to receiving the audio data: generating the second speaker features based on multiple instances of prior audio data, wherein generating the second speaker features based on the multiple instances of prior audio data are based on determining that the multiple instances of prior audio data: capture at least some of the second set of one or more terms, and were captured when the user was authenticated.

In some implementations, the second portion of the audio data is void of any general invocation wake words for the assistant device. In some versions of those implementations, the method further includes, prior to receiving the audio data: generating the second speaker features based on multiple instances of prior audio data. Generating the second speaker features based on the multiple instances of prior audio data can be based on determining that the multiple instances of prior audio data: capture at least some of the second set of one or more terms, and were captured when the user was authenticated.

In some implementations, the method further includes: performing speech recognition on the audio data to generate a recognition of the spoken utterance; and determining that the second set of one or more terms are included in the recognition and correspond to the second portion of the audio data. In some of those implementations, processing the second portion of the audio data and performing the second comparison of the second utterance features to the second speaker features for the second TD-SV are responsive to determining that the second set of one or more terms are included in the recognition and correspond to the second portion of the audio data.

In some implementations, processing the first portion of the audio data to generate the first utterance features includes first processing of the first portion of the audio data using a neural network model and the first utterance features are based on a first set of activations of the neural network model after the first processing. In some versions of those implementations, processing the second portion of the audio data to generate the second utterance features includes second processing of the second portion of the audio data using the neural network model and the second utterance features are based on a second set of activations of the neural network model after the second processing. In some alternative versions of those implementations, processing the second portion of the audio data to generate the second utterance features includes second processing of the second portion of the audio data using a second neural network model and the second utterance features are based on a second set of activations of the second neural network model after the second processing.

In some implementations, performing the first comparison includes determining a first distance measure between the first utterance features and the first speaker features, and performing the second comparison includes determining a second distance measure between the second utterance features and the second speaker features. In some versions of those implementations, determining, based on both the first comparison and the second comparison, to authenticate the user for the spoken utterance, includes: determining to authenticate the user based on an overall measure that is based on both the first distance measure and the second distance measure. In some of those versions, determining to authenticate the user based on the overall measure that is based on both the first distance measure and the second distance measure includes: determining a threshold that is dependent on an assistant interaction that is conveyed by the spoken utterance; and authenticating the user for the additional spoken utterance only responsive to determining the overall distance measure satisfies the threshold.

In addition, some implementations may include a system including one or more user devices, each with one or more processors and memory operably coupled with the one or more processors, where the memory(ies) of the one or more user devices store instructions that, in response to execution of the instructions by the one or more processors of the one or more user devices, cause the one or more processors to perform any of the methods described herein. Some implementations also include at least one non-transitory computer-readable medium including instructions that, in response to execution of the instructions by one or more processors, cause the one or more processors to perform any of the methods described herein.

What is claimed is:

1. A method implemented by one or more processors, the method comprising:

receiving audio data that captures a spoken utterance of a given user, the audio data being detected via one or more microphones of an assistant device of the given user;

processing a first portion of the audio data to generate first utterance features;

performing a first comparison of the first utterance features to first speaker features for a first text dependent speaker verification (TD-SV) for the user, the first TD-SV being dependent on a first set of one or more terms;

processing a second portion of the audio data to generate second utterance features, the second portion of the audio data being distinct from the first portion of the audio data;

performing a second comparison of the second utterance features to second speaker features for a second TD-SV for the user, the second TD-SV being dependent on a second set of one or more terms that are distinct from the first set of one or more terms;

determining, based on both the first comparison and the second comparison, to authenticate the user for the spoken utterance; and in response to determining to authenticate the user for the spoken utterance:

performing one or more actions, that are based on the spoken utterance.

2. The method of claim 1, wherein the first portion of the audio data captures a general invocation wake word for the assistant device, and wherein the first set of one or more terms on which the first TD-SV is dependent consists of one or more general invocation wake words for the assistant device, the general invocation wake word being one of the one or more general invocation wake words for the assistant device.

3. The method of claim 2, further comprising:

prior to receiving the audio data:

performing an enrollment procedure in which multiple utterances of the user are collected in response to one or more prompts to speak the general invocation wake word; and
generating the first speaker features as a function of the multiple utterances.

4. The method of claim 2, wherein the second portion of the audio data is non-overlapping with the first portion of the audio data, and wherein the second portion of the audio data is void of any of the one or more general invocation wake words for the assistant device.

5. The method of claim 4, further comprising:
prior to receiving the audio data:
generating the second speaker features based on multiple instances of prior audio data, wherein generating the second speaker features based on the multiple instances of prior audio data are based on determining that the multiple instances of prior audio data:
capture at least some of the second set of one or more terms, and
were captured when the user was authenticated.

6. The method of claim 1, wherein the second portion of the audio data is void of any general invocation wake words for the assistant device.

7. The method of claim 6, further comprising:
prior to receiving the audio data:
generating the second speaker features based on multiple instances of prior audio data, wherein generating the second speaker features based on the multiple instances of prior audio data are based on determining that the multiple instances of prior audio data:
capture at least some of the second set of one or more terms, and
were captured when the user was authenticated.

8. The method of claim 1, further comprising:
performing speech recognition on the audio data to generate a recognition of the spoken utterance; and
determining that the second set of one or more terms are included in the recognition and correspond to the second portion of the audio data;
wherein processing the second portion of the audio data and performing the second comparison of the second utterance features to the second speaker features for the second TD-SV are responsive to determining that the second set of one or more terms are included in the recognition and correspond to the second portion of the audio data.

9. The method of claim 1,
wherein processing the first portion of the audio data to generate the first utterance features comprises first processing of the first portion of the audio data using a neural network model and wherein the first utterance features are based on a first set of activations of the neural network model after the first processing, and
wherein processing the second portion of the audio data to generate the second utterance features comprises second processing of the second portion of the audio data using the neural network model and wherein the second utterance features are based on a second set of activations of the neural network model after the second processing.

10. The method of claim 1,
wherein processing the first portion of the audio data to generate the first utterance features comprises first processing of the first portion of the audio data using a first neural network model and wherein the first utterance features are based on a first set of activations of the first neural network model after the first processing, and
wherein processing the second portion of the audio data to generate the second utterance features comprises second processing of the second portion of the audio data using a second neural network model and wherein the second utterance features are based on a second set of activations of the second neural network model after the second processing.

11. The method of claim 1,
wherein performing the first comparison comprises determining a first distance measure between the first utterance features and the first speaker features; and
wherein performing the second comparison comprises determining a second distance measure between the second utterance features and the second speaker features.

12. The method of claim 11, wherein determining, based on both the first comparison and the second comparison, to authenticate the user for the spoken utterance, comprises:
determining to authenticate the user based on an overall measure that is based on both the first distance measure and the second distance measure.

13. The method of claim 12, wherein determining to authenticate the user based on the overall measure that is based on both the first distance measure and the second distance measure comprises:
determining a threshold that is dependent on an assistant interaction that is conveyed by the spoken utterance; and
authenticating the user for the additional spoken utterance only responsive to determining the overall distance measure satisfies the threshold.

14. An assistant device, comprising:
one or more microphones;
memory storing instructions;
one or more processors executing the instructions to:
receive audio data, detected via at least one of the microphones, that captures a spoken utterance of a given user;
process a first portion of the audio data to generate first utterance features;
perform a first comparison of the first utterance features to first speaker features for a first text dependent speaker verification (TD-SV) for the user, the first TD-SV being dependent on a first set of one or more terms;
process a second portion of the audio data to generate second utterance features, the second portion of the audio data being distinct from the first portion of the audio data;
perform a second comparison of the second utterance features to second speaker features for a second TD-SV for the user, the second TD-SV being dependent on a second set of one or more terms that are distinct from the first set of one or more terms;
determine, based on both the first comparison and the second comparison, to authenticate the user for the spoken utterance; and
in response to determining to authenticate the user for the spoken utterance:
cause performance of one or more assistant actions, that are conveyed by the spoken utterance.

15. The assistant device of claim 14, wherein the first portion of the audio data captures a general invocation wake word for the assistant device, and wherein the first set of one or more terms on which the first TD-SV is dependent consists of one or more general invocation wake words for the assistant device, the general invocation wake word being one of the one or more general invocation wake words for the assistant device.

16. The assistant device of claim 15, wherein the second portion of the audio data is non-overlapping with the first portion of the audio data, and wherein the second portion of the audio data is void of any of the one or more general invocation wake words for the assistant device.

17. The assistant device of claim 14, wherein the second portion of the audio data is void of any general invocation wake words for the assistant device.

18. The assistant device of claim 14,
wherein in performing the first comparison one or more of the processors are to determine a first distance measure between the first utterance features and the first speaker features; and
wherein in performing the second comparison one or more of the processors are to determine a second distance measure between the second utterance features and the second speaker features.

19. The assistant device of claim 18, wherein in determining, based on both the first comparison and the second comparison, to authenticate the user for the spoken utterance, one or more of the processors are to:
determine to authenticate the user based on an overall measure that is based on both the first distance measure and the second distance measure.

20. The assistant device of claim 19, wherein in determining to authenticate the user based on the overall measure that is based on both the first distance measure and the second distance measure, one or more of the processors are to:
determine a threshold that is dependent on the one or more assistant actions that are conveyed by the spoken utterance; and
authenticate the user for the additional spoken utterance only responsive to determining the overall distance measure satisfies the threshold.

* * * * *